Jan. 10, 1928.

A. C. LIPPERT 1,655,964

RADIATOR CAP

Original Filed Jan. 24, 1923

Inventor.
Aloysius C. Lippert
By Munday, Clarke & Carpenter
Attys

Patented Jan. 10, 1928.

1,655,964

UNITED STATES PATENT OFFICE.

ALOYSIUS C. LIPPERT, OF KENOSHA, WISCONSIN, ASSIGNOR, BY DIRECT AND MESNE ASSIGNMENTS, TO THE NORLIPP COMPANY, OF CHICAGO, ILLINOIS, A CORPORATION OF ILLINOIS.

RADIATOR CAP.

Original application filed January 24, 1923, Serial No. 614,519. Divided and this application filed November 3, 1924. Serial No. 747,433.

This invention relates generally to an improved type of radiator cap, and particularly to such a cap adapted for use in locking motor meters such as are now commonly employed upon automobiles thereto.

This application is a division of Aloysius C. Lippert's application for lock washer, S. N. 614,519, filed January 24, 1923.

A principal object of the invention is the provision of means for locking a motor meter to a radiator cap which may be employed without special formation of the cap, or the employment of intricate parts which would add to the cost of production or cause inconvenience in service.

Another object of the invention is the provision of a lock washer of the character stated, which may be readily arranged in locking position by the mere tightening of the usual nut provided on the motor meter stem.

Another object of the invention is the provision of a lock washer of the character stated which will effectively and permanently lock the motor meter against theft.

Other objects and advantages of the invention will be apparent as it is better understood from the following description, which, taken in connection with the accompanying drawings, discloses a preferred embodiment thereof.

Referring to the drawings.

Figure 1:
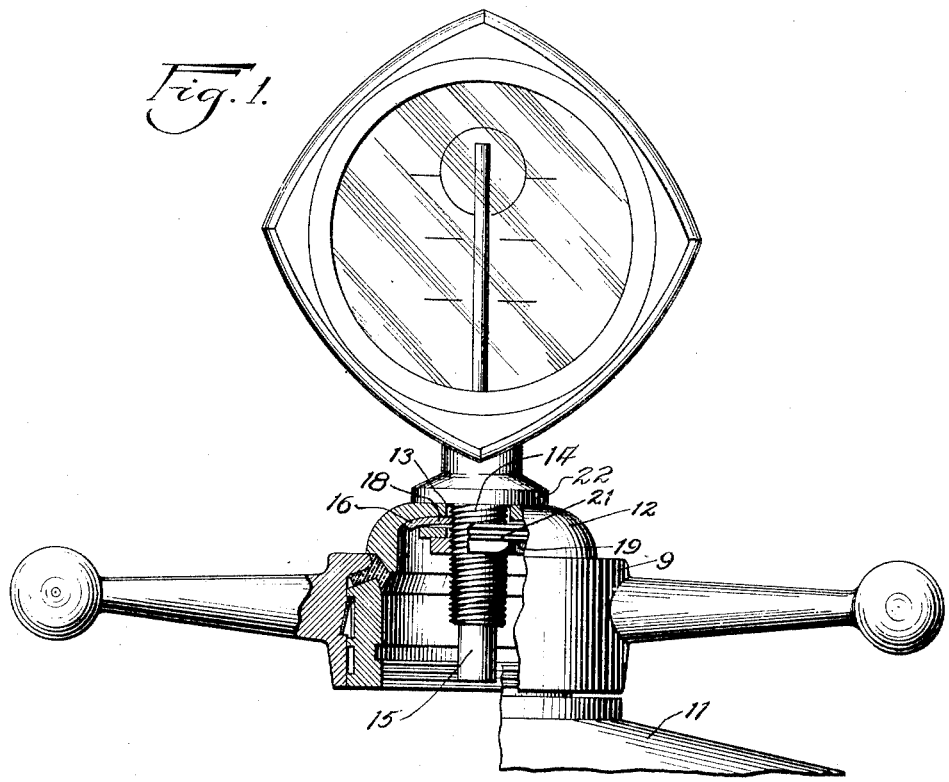
Fig. 1 is a front elevation, partially in section, of a radiator cap and motor meter assembly in which a lock washer embodying my invention is employed.
Figure 2:
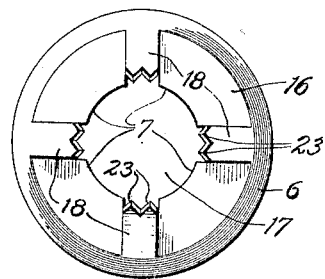
Fig. 2 is the top plan view of the washer.

I have illustrated my invention on the drawings in connection with a radiator cap 9, which is adapted to be secured upon a radiator neck 11 by any prefererd locking means, the latter usually consisting of an insert, adapted to be threaded, or otherwise secured on to the radiator neck and bearing such relation to said cap 9 that the latter may not be removed after being positioned.

Said cap is provided with a hinged cover 12, non-removably hinged thereto by any suitable means, which has an opening 13 in the top thereof, through which the stem 14 of the motor meter generally indicated at 15 extends. Said motor meter may be of any approved type of instrument now commonly used for indicating the temperature of the motor and is of considerable value, requiring safe-guarding against theft. I, therefore, provide a lock washer 16 adapted to be placed upon the motor meter stem 14 on the interior of the cover 12, and to be brought into locking engagement with said stem in a manner to be hereinafter described.

Figure 3:
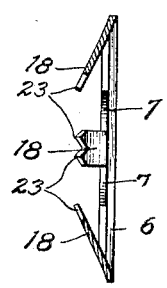
Fig. 3 is a cross section thereof showing the locking lugs in their position prior to assembly.

Said washer 16 in the present instance is in the form of a disk provided with an angular flange 6, a central opening 17 of a slightly larger diameter than the selected motor meter stem through which the stem 14 may extend. Locking lugs or prongs 18 are provided in the washer and are lifted from the plane thereof, as indicated in Fig. 3, so that the inner extremities are disposed at or beyond the periphery of the opening 17 and out of the path of the motor meter stem, the material between said locking lugs or prongs providing guides therefor. The wall segments 7 of the opening 17 provide abutments for positively locating the motor meter stem.

Figure 4:
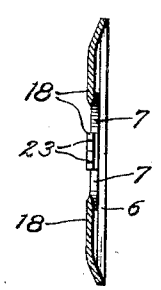
Fig. 4 is a similar view showing the lugs bent to locking position.

When the washer is positioned, said lugs 18 are arranged against the inside of cover 12. A nut 19 is then turned onto the threaded stem 14 a sufficient extent to bend the lugs 18 toward the plane of the washer, so that the points thereof extend into the opening 17 and uniformly engage in the threads of said motor meter stem 14. This action is rendered positive by wall segments 7 having a firm engagement with the peripehry of the threaded stem. A second washer 21 may be interposed between the lock washer 16 and the nut 19 if desired. A shoulder 22 is provided on the motor meter outside the cover 12 and cooperates with said washer to lock the stem to said cover. When the lugs 18 are bent to the position shown in Fig. 4, the inner extremities thereof, which, in the present instance, are serrated or sharpened by points 23, being disposed between the threads of the stem and upon effort to turn the motor meter stem will cut across said threads to form a circular groove in which said lugs permanently engage, further pressure or flattening action will cause contraction of the central opening 17, which therefore firmly grasps the motor meter stem and insures positive cutting action of the locking lugs or prongs 18. The motor meter is thus effectively locked onto the cover 12, and inasmuch as said cover is permanently hinged to the cap 9, which is locked to the radiator neck, theft, or accidental removal of the motor meter is prevented.

While the adaptation of the invention hereinbefore described is one to which it is particularly suited, it is, of course, manifest that the washer which I provide may be employed in connection with other devices and parts which it is desired to lock in place.

It is thought that the invention and many of its attendant advantages will be apparent as it is better understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The combination of a radiator cap adapted to be applied to the filling opening of an automobile radiator or the like and having an aperture in the top thereof, an auxiliary device having a stem extending through said aperture, a locking washer positioned upon said stem within said cap and comprising a metal disk cut away at its center to receive the stem, said disk having a plurality of slits therein arranged to provide a plurality of arms bendable from the plane of the disk and adapted to be guided by the adjacent metal during relative movement of the disk or arm, said arms having sharpened extremities adapted to bite into said stem when the arms are bent to the plane of the disk, and means for exerting flattening pressure upon the washer whereby said arms are caused to grip said stem to lock the device to the cap against theft.

2. The combination of a radiator cap adapted to be applied to the filling opening of an automobile radiator or the like and having an aperture in the top thereof, an auxiliary device having a stem extending through said aperture, a locking washer positioned upon said stem within said cap and comprising a metal disk cut away at its center to receive the stem, said disk having a plurality of slits therein arranged to provide a plurality of arms bendable from the plane of the disk and adapted to be guided by the adjacent metal during relative movement of the disk or arm, said arms having sharpened extremities adapted to bite into said stem when the arms are bent to the plane of the disk, and means for exerting flattening pressure upon the washer with said arms against the under side of the cap whereby said arms are caused to grip said stem to lock the device to the cap against theft.

ALOYSIUS C. LIPPERT.